FIG. 1

INVENTORS
John W. Lothrop
Richard R. Wareham

BY Brown and Mikulka
ATTORNEYS

July 15, 1958   J. W. LOTHROP ET AL   2,843,029
PHOTOGRAPHIC APPARATUS INCLUDING SHEET-ARRESTING
AND CONTROL MECHANISM
Filed Dec. 2, 1954   6 Sheets-Sheet 6

FIG. 9

INVENTORS
John W. Lothrop
Richard R. Wareham

BY Brown and Mikulka
ATTORNEYS

United States Patent Office 2,843,029
Patented July 15, 1958

2,843,029

PHOTOGRAPHIC APPARATUS INCLUDING SHEET-ARRESTING AND CONTROL MECHANISM

John W. Lothrop, Westwood, and Richard R. Wareham, Marblehead, Mass., assignors to Polaroid Corporation, Cambridge, Mass., a corporation of Delaware Application December 2, 1954, Serial No. 472,746

15 Claims. (Cl. 95—13)

This invention relates to mechanism for arresting advancement of sheet materials and is particularly concerned with novel mechanism for arresting movement of sheet material advanced through photographic apparatus.

It has been proposed to provide, in photographic apparatus through which sheet material is advanced, mechanism for arresting the movement of the sheet material at predetermined intervals. Sheet-arresting mechanism of this type, disclosed in Patent No. 2,543,159, issued February 27, 1951, to Murry N. Fairbank, generally includes at least one stop member adapted to engage successive regularly spaced engageable portions of the sheet material as the latter is advanced and an engageable portion thereof becomes aligned with the stop member. The stop member is mounted on resilient means so as to be movable in a plurality of directions and is normally urged into engagement with sheet material and in a direction opposite the direction of movement of the latter. As the stop member becomes engaged by a portion of the sheet material, it is moved forward therewith against the bias of the resilient mounting means until its movement, and that of the sheet material, are arrested by means defining the limit of movement of the stop member. To permit continued predetermined advancement of the sheet material, the stop member is moved in a direction substantially normal to the direction of movement of the sheet material out of engagement with the engageable portion thereof. Upon withdrawal from engagement with the sheet material, the stop member moves under the bias of its mounting means in a direction opposite the direction of advancement of the sheet material. By virtue of this arrangement, only a momentary withdrawal of the stop member is required to permit it to return to a position wherein it is adapted to engage the next successive engageable portion of the sheet material as it is advanced into alignment with the stop member. The release means may take the form of a push button or the like for pivoting the means on which the stop member is mounted. While this type of stop means is essentially satisfactory, its proper operation is dependent on the operator advancing the sheet material until the stop member is moved thereby against its limit stop. If the operator fails to do this and ceases to advance the sheet material when the stop member first becomes engaged with an engageable portion of the sheet, the stop member reengages said engageable portion when the push button is released. Any subsequent attempt by the operator, believing the stop member to be disengaged from the sheet material, to advance the sheet material thereafter is very likely to result in tearing of the sheet.

In cameras of the type wherein a photosensitive sheet is exposed and thereafter processed, a photosensitive sheet may be superposed with a second sheet and the sheets advanced between a pair of pressure-applying members, preferably rollers, for spreading a processing composition in a layer between the sheets. One of the sheets includes, in addition to portions adapted to engage the stop member, means for collecting any excess of processing composition spread between the sheets. These collecting means, disclosed in Patent No. 2,686,717, issued August 17, 1954, to Edwin H. Land, due to their thickness, cause an added resistance to movement of the sheets as they are advanced between the pressure-applying members. The operator may believe this added resistance to be caused by the engagement of the stop members with the engageable portions of the sheet material and therefore discontinue to advance the sheets. Then, after the operator has operated the release button and is again advancing the sheet material through the camera, the stop members unexpectedly engage the same engageable portions of the sheet which the operator had erroneously thought to be engaged previously. Since this engagement of the sheet and stop members occurs so unexpectedly, the operator may continue to advance the sheet, causing it to be torn.

Accordingly, objects of the present invention are: to provide, in photographic apparatus that comprises a housing defining a path through which a sheet is adapted to advance, a novel stop means for arresting advancement of said sheet; to provide a stop means for arresting advancement of a sheet that has a succession of marginal engageable portions, said stop means including at least one stop member normally positioned to engage at least one of said engageable portions, manually operable means for disengaging said stop member from said engageable portion and means responsive to movement of said sheet for operatively positioning said stop member for engagement with the next successive pair of engageable portions; to provide photographic apparatus for exposing and processing successive frames of a photosensitive sheet wherein a pair of pressure-applying members are provided between which said photosensitive sheet and a second sheet may be advanced in superposed relation with a layer of processing composition therebetween to form a sandwich, said apparatus including a housing providing a first chamber in which a frame of said photosensitive sheet is positioned for exposure and a second chamber into which said sandwich is advanced during processing, said apparatus being provided with novel stop means operative to predeterminedly arrest advancement of said sandwich with a frame of said photosensitive sheet properly positioned for exposure in said first chamber; to provide stop means including a pair of stop pins at least one of which, when operatively positioned, is capable of engaging at least one of a pair of successive pairs of apertures in a sheet to arrest the advancement of said sheet, means for inoperatively positioning said stop pins and means responsive to movement of said sheet to operatively position said stop pins after said sheet has advanced to such an extent that said stop pins are capable of engaging only the next successive pair of apertures as they become aligned with said pins; to provide stop means of the above type including manually operable means for inoperatively positioning said stop pins, holding means for retaining said stop pins in inoperative position and means actuated by engagement with said apertures during movement of said sheet for releasing said stop pins from said holding means and operatively positioning said stop pins; to provide, in a camera of the self-developing type, a pair of pressure-applying rollers between which said sheets are adapted to advance and stop means including stop pins and means responsive to the rotation of one of said rollers for operatively positioning said stop pins, and to provide apparatus of the above type that is simple in operation and inexpensive in construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The sheet-arresting mechanism of the present invention is particularly adapted to use in photographic apparatus of the type herein illustrated and which generally includes means for processing an exposed photosensitive sheet by superposing said photosensitive sheet on a second sheet and spreading a thin layer of processing composition between said sheets. The photosensitive sheet includes a layer of photosensitive material, preferably an emulsion of silver halide, in which a latent image may be attained by differential exposure to actinic light cast on a suitable support or backing. The second sheet is preferably adapted to serve as a support for an image-receptive layer in which a visible print of a latent image in a photosensitive layer may be produced. The processing composition, when spread in a uniformly thin layer between the photosensitive and second sheets, preferably effectuates a silver halide diffusion transfer-reversal process by which a latent image in the photosensitive sheet is developed and a positive print is produced in the second sheet.

Examples of photographic materials useful in processes of the foregoing type are described in detail in Patent No. 2,543,181, issued to Edwin H. Land on February 27, 1951. It is, of course, to be understood that the apparatus herein described is not limited to use with any particular species of photosensitive or second sheets, the terms "photosensitive" and "second sheet" being used in their broadest sense to indicate a first sheet which is photosensitive and a second sheet which merely may aid in spreading the processing composition over the surface of the photosensitive sheet, or which may, if desired, possess other characteristics.

Generally, the camera in which the sheet-arresting mechanism is embodied, includes an exposure chamber in which portions or frames of a photosensitive sheet may be successively positioned for exposure to actinic light and a processing chamber into which said portions are advanced during processing. At the entrance to the processing chamber, there is provided a pair of pressure-applying rollers adapted to receive therebetween a photosensitive sheet from the exposure chamber and to superpose said sheet with a second sheet. The second sheet has on one of its surfaces a succession of image-receiving areas registrable with said frames and has affixed thereto a succession of containers of the processing composition, one container being associated with each image-receiving area. As the sheets are advanced in superposed relation between the pressure-applying rollers, processing composition is ejected from a container and spread in a thin layer between a frame of the photosensitive sheet and an image-receiving area of the second sheet, thereby forming a sandwich which advances in to the processing chamber. Novel stop means are provided for arresting advancement of the sheet when one frame and the image-receiving area with which it is registered have passed entirely between the rollers into the processing chamber and another frame of the photosensitive sheet is in position for exposure. The aforementioned superposed frame and area are allowed to remain within the processing chamber for a predetermined period during which a positive print is formed in the image-receiving area with which said frame is superposed. At the end of the predetermined processing period, the processing chamber may be opened and the developed positive print may be removed.

Referring now to the drawings wherein like numerals denote like parts, there is shown in Figs. 1 through 7 a simple, inexpensive hand-held camera of the folding type which embodies the present invention. As a means for supporting and enclosing the various components of the camera, a housing generally designated at 20 is provided and associated with housing 20 is a suitable lens and shutter assembly 22 which may be of any conventional design. In the form shown, housing 20 comprises a front portion 24 which provides a central re-entrant section 26 having a light-transmitting aperture 28. Section 26 further provides guide surfaces 30, on either side of aperture 28, on which portions of a photosensitive sheet may be positioned for exposure in the focal surface of the lens of assembly 22. A suitable guide roller 32 may be provided adjacent one end of aperture 28 to hold said photosensitive sheet on surfaces 30. A suitable bellows 34 provides an optical path from the lens of assembly 22 to a photosensitive sheet positioned adjacent aperture 28 on surfaces 30. One end of bellows 34 is fastened in a lighttight fashion to assembly 22 by such means as a centrally apertured clamping plate 36 suitably connected to assembly 22. The other end of bellows 34 is fastened in a lighttight fashion to re-entrant section 26 by such means as turned-in clamping flanges 38.

Figure 1:
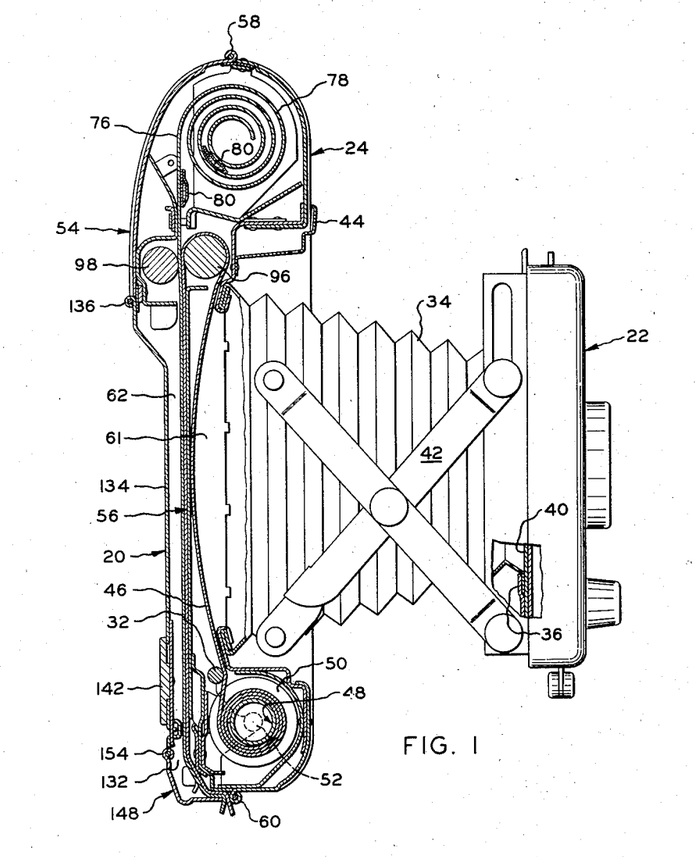
Figure 1 is a diagrammatic, fragmentary view, partially in section, of a camera embodying the herein disclosed invention with a photosensitive sheet and another sheet mounted therein, the section being taken substantially along a line midway between the sides of the camera.

Lens and shutter assembly 22 is mounted on a support plate 40, the latter being secured to a conventional scissors-type erecting mechanism 42 illustrated in Fig. 1 in extended position. Erecting mechanism 42 is secured within re-entrant section 26, the latter being adapted to partially house assembly 22 when mechanism 42 is collapsed. To retain assembly 22 within re-entrant section 26, there is provided a conventional latch 44 secured to front portion 24 adjacent one end of re-entrant section 26. Spring means are provided for causing erecting mechanism 42 to extend itself and remain in extended position when latch 44 is released.

A photosensitive sheet, designated at 46 and adapted to be exposed and processed within the camera, is carried by a spool 48 of conventional design having a spindle around which sheet 46 is coiled, a pair of discs 50 for aligning the successive convolutions of sheet 46, and a pair of stub shafts 52 extending from opposite ends of the spool.

In accordance with the present invention, means are provided defining an exposure chamber wherein frames of photosensitive sheet 46 are positioned for exposure, and a processing chamber into which portions of sheet 46 may be advanced during processing. Said means, in the form shown, comprise a rear portion 54 and an intermediate portion 56 of housing 20. Viewing Fig. 1, rear portion 54 is pivotally attached to the upper extremity of front portion 24 by a hinge 58 and intermediate portion 56 is pivotally attached to the lower extremity of front portion 24 by a hinge 60. When in closed position, portion 56 defines an exposure chamber 61 in conjunction with bellows 34. When in closed position, portions 54 and 56 define, between their adjacent overlapping surfaces, a processing chamber 62.

As a means for mounting a supply of photosensitive sheet 46, there is provided a U-shaped member 64 having a curved bight portion 66 and a pair of legs 68. Bight portion 66 is secured to the inside of front portion 24 adjacent its lower extremity by such means as rivets 70. Legs 68 are positioned adjacent opposite ends of front portion 24 and each leg is provided with a slot 72 that is adapted to receive one of stub shafts 52. When stub shafts 52 are seated in slots 72, discs 50 act to prevent longitudinal movement of spool 48. To prevent excess rotation of spool 48 and to retain shafts 52 in slots 72, there is provided a drag spring 74 secured at its central portion to intermediate portion 56 and having ends 75 adapted to engage discs 50. A pair of plates 77 are provided secured to intermediate portion 56, each having a turned-up edge 79, and adapted to extend between leg 68 and the side walls of the housing to act as light shields preventing fogging of the photosensitive sheet.

A second sheet 76, in conjunction with which photosensitive sheet 46 may be processed, is shown in Fig. 1 as being supplied from a roll 78. Sheet 76 preferably comprises a suitable base and a suitable image-receiving layer on one side of the base. The image-receiving layer, for example, may comprise one of the compositions now well known in the art which adapts it to receive, in successive image-receiving areas thereof, positive prints of the latent images in frames of photosensitive sheet 46. A succession of containers, designated generally at 80 in the illustrated embodiment, are provided for carrying the liquid processing composition. As shown, containers 80 are affixed to the image-receiving layer of sheet 76 at substantially regularly spaced intervals from a location adjacent a leading end thereof toward the trailing end thereof, containers 80 being so spaced that one container is associated with one image-receiving area. Each container is provided with a rupturable mouth facing the trailing edge of sheet 76, which mouth is adapted to eject processing composition when opposed compressional forces are applied to container 80.

The camera includes a single sheet metal member 82 providing an anvil 84 having a surface in contact with which sheet 76 is adapted to advance, and means for mounting roll 78 within housing 20. Sheet metal member 82 is generally U-shaped, having a bight portion 86 and two legs 88. Member 82 is secured in the inside of front portion 24 at re-entrant section 26 by such means as rivets 90. Legs 88, positioned adjacent opposite sides of front portion 24, are securely seated by turned-in tabs 92 secured to front portion 24 adjacent hinge 58 by rivets 94. Legs 88 are adapted to engage the ends of roll 78 to properly position the latter, and the rear portion of bight portion 86 is bent to provide anvil 84.

Pressure-applying means are provided for processing latent images in frames of sheet 46 and, in the form shown, the pressure-applying means comprise a pair of rollers 96 and 98 between which sheets 46 and 76 may be advanced in superposed relation. Advancement of a frame of sheet 46 and an associated image-receiving area of sheet 76 between the rollers causes ejection of processing composition from the mouth of a container 80 and spreading of said processing composition between the sheets to form a sandwich in which the latent image in a frame is processed and a positive print is formed in the image-receiving area.

Roller 96 (see Fig. 4) is provided with a pair of shouldered end portions 100 and an intermediate pressure-applying surface 102. Roller 98 is provided with a pressure-applying surface 104. When sheets 46 and 76 are advanced in superposition between rollers 96 and 98, shouldered end portions 100 are spaced from surface 102 by a distance equal to the combined thicknesses of sheets 46 and 76. Rollers 96 and 98 are so constructed that under such circumstances, surface 102 is spaced from surface 104 by a distance equal to the combined thicknesses of sheets 46 and 76 plus a predetermined increment substantially equal to the height of shouldered end portions 100, which determines the thickness of the layer of processing composition spread between the sheets. In the illustrated embodiment, roller 96 is mounted on intermediate portion 56 and roller 98 is mounted on rear portion 54, the rollers being so mounted as to be operatively juxtaposed when portions 54 and 56 are in closed position and to be spaced apart to permit sheets 46 and 76 to extend therebetween when portions 54 and 56 are in open position.

In order to generate pressure between rollers 96 and 98, spring means are provided for mounting roller 96 and biasing said roller toward roller 98 when portions 54 and 56 are in closed position. Roller 96 is mounted on a pair of springs 106 (see Fig. 8), secured to the opposite edges of and adjacent the free end of intermediate portion 56. Each of springs 106, formed of a resilient wire, is substantially straight and includes a rounded loop 108 formed in one end and an elongated loop 110 at its other end. Each spring 106 is secured to intermediate portion 56 by a rivet 112 extending through loop 108 so that elongated loop 110 extends beyond the free end of portion 56. A second rivet or pin 114 is secured to intermediate portion 56 so as to engage spring 106 intermediate its ends and urge loop 110 toward the rear of the camera when portions 54 and 56 are in closed position. Each loop 110 provides means for slidably mounting bushings 116 and extending from opposite ends of roller 96 are a pair of stub shafts 118 which are rotatably received in bushings 116. By virtue of the slidable construction of bushings 116 in loops 110, roller 96 is movable longitudinally of loops 110 or, otherwise stated, is movable in a plane generally parallel to intermediate and rear portions 54 and 56 when rollers 96 and 98 are operatively juxtaposed.

Roller 98 is mounted on rear portion 54 by a pair of brackets 120 each having a base 122 at which it is secured to rear portion 54 by rivets 124 and a bearing slot 126. Extending from opposite ends of roller 98 are a pair of stub shafts 130 journaled in slots 126 in brackets 120. In the illustrated embodiment, effective spreading of processing composition between sheets 46 and 76 is dependent upon the position and direction of compressional forces exerted by rollers 96 and 98. In order that these compressional forces be correctly positioned and applied, precise alignment of the rollers is desirable. As a means for operatively aligning the rollers when intermediate portion 56 and rear portion 54 are in closed position, there are provided a pair of fingers 128 extending from the ends of brackets 120 and which are adapted to abut against bushings 116 in order to align rollers 96 and 98. Viewing Fig. 1, advancement of sheets 46 and 76 between rollers 96 and 98 urges said rollers downward until stub shafts 130 reach the ends of slots 126 and until bushings 118, riding in loops 110, engage fingers 128.

In practice, sheet 46 extends from spool 48 into contact with guide roll 32 across guide surfaces 30 and into contact with pressure roller 96. Sheet 76 extends from roll 78 into contact with roller 98 and into superposition with sheet 46 to form therewith a sandwich extending between the rollers into processing chamber 62. Viewing Figs. 1 and 2, the lower sections of rear portion 54 and intermediate portion 56 are so constructed as to provide processing chamber 62 with an exit passage 132 through which portions of the sandwich positioned within the processing chamber may be removed therefrom. An operator, by grasping the leading portion of the sandwich extending from passage 132, may draw the sandwich through passage 132 and thereby may advance unprocessed portions of sheets 46 and 76 between rollers 96 and 98 into processing chamber 62.

Thus, a frame of sheet 46, initially positioned for exposure on guide surfaces 30, may be advanced toward registration with an image-receiving area of sheet 76. Continued advancement of sheets 46 and 76 between rollers 96 and 98 causes ejection of processing composition from the container 80 associated with said frame and image-receiving area and causes spreading of the processing composition therebetween to form a sandwich. The frame and image-receiving area advance from rollers 96 and 98 into processing chamber 62 and are permitted to remain therewithin for a predetermined processing time during which the latent image in the frame is processed and a positive print is formed in the image-receiving area.

To enable an operator to remove the developed positive print from processing chamber 62, there is provided a suitable means such as a door 134 in rear portion 54. As shown, door 134 is pivotally mounted at one end to rear portion 54 at a hinge 136. Suitable means are provided for latching door 134 in closed position, said means, in the form shown, comprising a latch tongue 138 slidably secured on the inside of door 134 and adapted to extend through a slot 140 in rear portion 54 when door 134 is in closed position. To operate the latch, there is provided a button 142 positioned in an elongated slot 144 in door 134. Button 142 is secured to tongue 138 by such means as rivet 146 so that an operator may slide the end of tongue 138 into and out of latched position in slot 144 by manually engaging button 142. When an image-receiving area and a frame with which it is registered have remained in processing chamber 62 for a predetermined processing period, door 134 may be opened, the positive print may now be ripped from the remainder of sheet 76, the ripping being aided by a series of perforations (not shown) which separate the image-receiving area from the remainder of sheet 76, and at the same time may be peeled from the frame of sheet 46 with which it has been registered.

It is desirable that light be excluded from chamber 62 during processing of a frame and an image-receiving area registered therewith and means are provided for rendering exit passage 132 lighttight. As shown, these means comprise a yoke-shaped bar 148 having two arms 150 and 151 and a transverse connecting member 152. Bar 148 is pivotally secured at member 152 to portion 54 by a hinge 154 so that member 152 overlies passage 132 when bar 148 is in closed position and snugly contacts portions of housing 20 adjacent passage 132 and arms 150 and 151 extend on opposite sides of rear portion 54 adjacent passage 132. Member 152 is pivotable to one side of said passage and such means as a torsion spring 156, coiled around the hinge pin 155, is provided for urging member 152 of bar 148 into closed position overlying passage 132. An edge 158 of transverse member 152 is in contact with superposed sheets 46 and 76 extending through exist passage 132 and serves as a cutting blade against which an operator can draw portions of the sandwich extending through passage 132 to sever said portions from portions remaining within chamber 62. A pair of guide members 250 may be provided in passage 132 for guiding the sheets through said passage and for supporting the sheets against bar 148.

Means are provided for releasably locking bar 148 in closed or passage-covering position and, in the form shown, comprise a pin 160 extending from a side of housing portion 54 and underlying arm 150 when bar 148 is in closed position. Arm 150 is provided with an aperture 162 aligned with pin 160 so that the latter projects into aperture 162 when the bar is in closed position and thereby locks said bar. So that bar 148 can be released and pivoted rearward out of closed position, hinge 154 is so constructed as to permit limited movement of said bar axially on pin 155 of hinge 154. Spring 156 is adapted not only to urge the bar into closed position but to urge arm 150 axially into engagement with pin 160. The leading edge portion 164 of arm 150 (when arm 150 is being pivoted into closed position) is turned or bent outward so that edge portion 164 will ride over the end of pin 160 to move the arm axially against spring 156 and permit the movement of the arm into closed position until pin 160 extends into aperture 162. To release bar 148 and pivot it into inoperative position, the operator may manually grasp the bar, moving it axially against the bias of spring 156 so as to disengage aperture 162 from pin 160 and pivot bar 148 against the bias of spring 154 to one side of passage 132.

Latch means are provided for securing rear portion 54 in closed position, said latch means operating adjacent the sides of housing 20 in order not to obstruct passtage 132. The latch means comprise an engagement section 165 of each side of rear portion 54 having an edge providing a ramp section 166 and a re-entrant section 168. Engagement sections 165 are adapted to extend between the sides of front portion 24, the latter being provided with a pair of pins 170 secured in slots 171 in the sides of forward portion 24 for movement toward the lower extremity (viewing Fig. 1) of housing 20. A push button 172 is secured to the outer end of each pin 170 and a washer 173 is secured to each pin to retain the latter in slot 171 and render said slot lighttight. A spring, having a base 174 and two legs 176 in engagement with pins 170, is provided to urge said pins in the slots into engagement with engagement sections 165. During pivotal movement of rear portion 54 into closure position, each ramp section 166 coacts with a pin 170 to deflect the latter against the bias of the spring until pins 170 extend into re-entrant section 168 and are engaged and retained thereby. In order to pivot rear portion 54 rearward into open position, the operator moves push buttons 172 downward (viewing Figs. 5 and 6) in the slots so as to disengage pins 170 from re-entrant sections 168.

Suitable shields are provided for excluding light from exposure chamber 61 when either or both door 134 and bar 148 are open. One such shield is shown at 178 as comprising a portion of a sheet metal member 180 secured to rear portion 54 and bent inwardly so as to contact a surface of sheet 76 extending into chamber 62. Another light shield comprises the free end portion 182 of intermediate portion 56 turned inwardly adjacent pressure roller 96.

Stop means are provided for arresting the movement of the sandwich upon advancement of a predetermined length thereof between pressure rollers 96 and 98. In order to adapt it for use in the illustrated embodiment, sheet 76 is provided with pairs of regularly spaced perforations or openings 184, the openings of each pair being in the opposite marginal portions of sheet 76 and one pair being associated with one image-receiving area of the sheet. In addition, a pair of the aforementioned means for collecting excess processing composition is associated with each image-receiving area of sheet 76 and is positioned closely adjacent each pair of perforations 184, and, in a preferred form, the perforations extend through a portion of the collecting means. The stop means includes means adapted to engage at least one of successive pairs of perforations to arrest movement of sheets 46 and 76 upon advancement of one frame of sheet 46 and the image-receiving area of sheet 76 with which it is registered into processing chamber 62. As shown, the stop means includes anvil 84 that is formed integrally with member 82 and that is provided with a surface in superposition with which sheet 76 is adapted to move during advancement. This surface is provided with a pair of depressions or grooves 186 over which perforations 184 are adapted to move in aligned relation therewith. The stop means includes a pair of stop pins 188 mounted in alignment with grooves 186 and adapted to project into and engage perforations 184 of sheet 76 as said perforations become aligned with said pins during advancement of the sheets.

Figure 2:
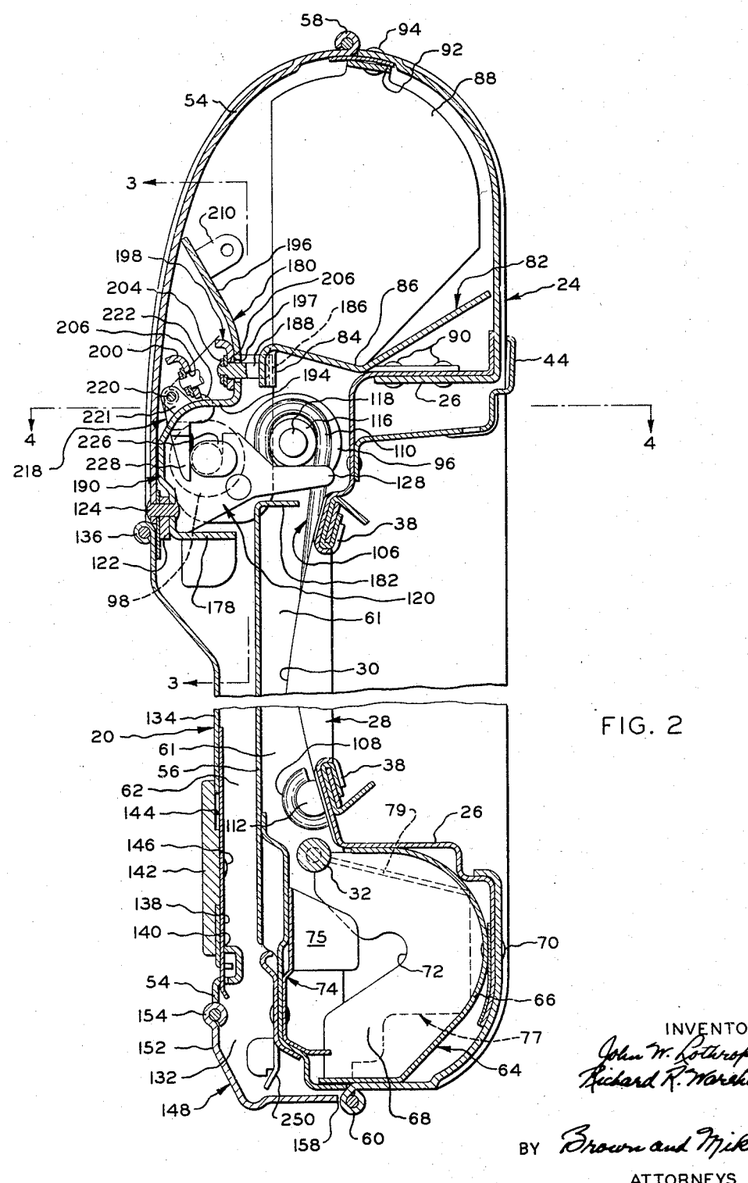
Fig. 2 is a fragmentary, sectional view of the camera of Fig. 1 taken along a line substantially midway between the sides.
Figure 3:
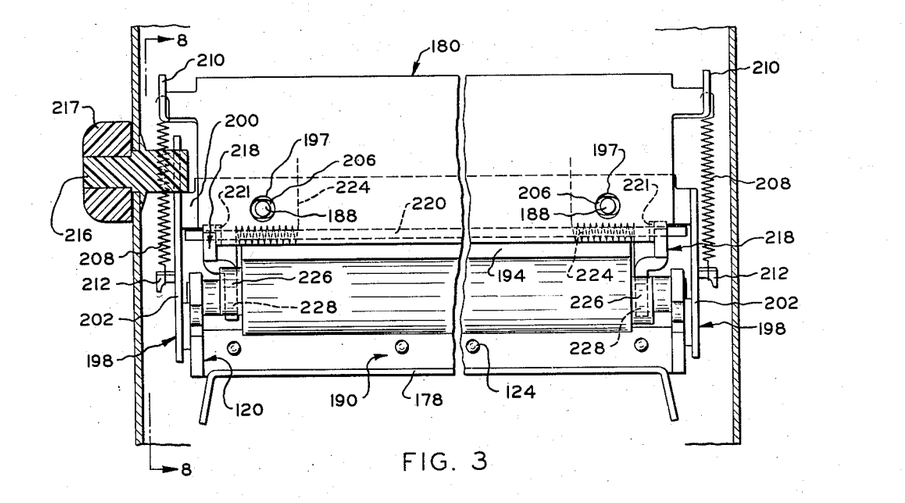
Fig. 3 is a fragmentary, sectional view taken along the line 3—3 of Fig. 2.
Figure 4:
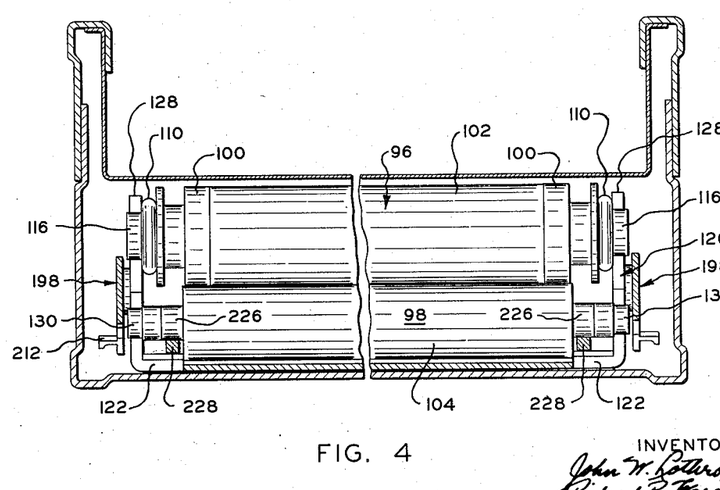
Fig. 4 is a fragmentary, sectional view taken along the line 4—4 of Fig. 2.
Figure 5:
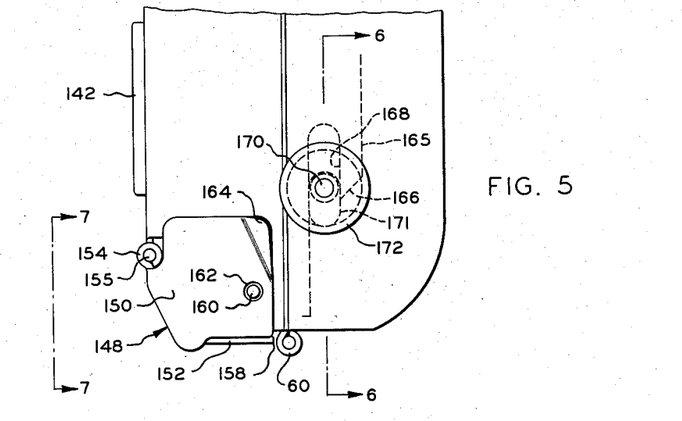
Fig. 5 is a fragmentary view of one end portion of the camera of Fig. 1.
Figure 6:
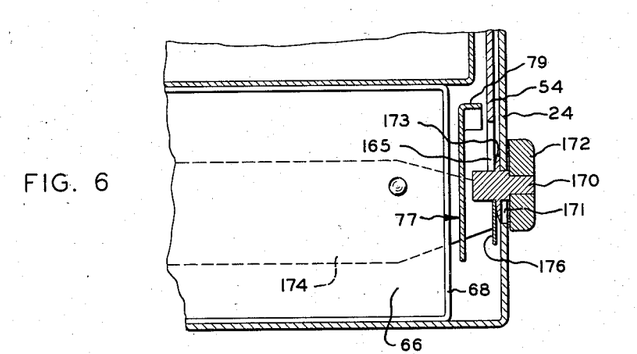
Fig. 6 is a fragmentary, sectional view taken along the line 6—6 of Fig. 5.
Figure 7:
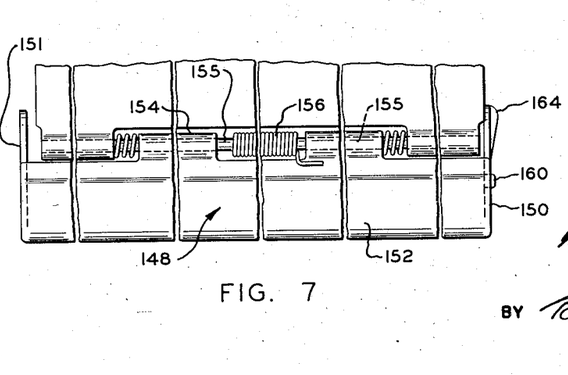
Fig. 7 is a plan view taken along the line 7—7 of Fig. 5.

Member 180 includes a channel-shaped base portion 190 underlying pressure roller 98 and at which member 180 is secured to rear housing portion 54 by suitable means such as rivets 124. Light shield 178 comprises one side of base portion 190 and the other side 194 is curved and joined with a curved support portion 196 substantially equal in length to the width of the sheets and having a surface across and in contact with which sheet 76 is adapted to advance between said surface and anvil 84. Side 194 provides means cooperating with roller 98 to retain stub shafts 130 in slots 126 in brackets 120. Support portion 196 includes a pair of apertures 197 in alignment with grooves 186 through which pins 188 are adapted to project. To mount stop pins 188, there is provided a U-shaped support member 198 having a base portion 200 underlying support portion 196 and a pair of arms 202 extending from the ends of base portion 200. Arms 202 are pivotally secured adjacent their free ends to brackets 120 so that base portion 200 is pivotable, as shown in Fig. 2, from a position underlying support portion 196 and closely adjacent its rear surface to a position adjacent rear housing portion 54. Stop pins 188 are secured to the ends of a leaf spring 204 secured at its mid-portion to the rear side of base portion 200 with pins 188 projecting through a pair of apertures 206 in base portion 200 aligned with apertures 197 in support portion 196. It is by virtue of this arrangement of stop pins mounted on the ends of spring 204 secured to base portion 200 of pivotal support member 198 that pins 188 are movable both independently and together in a direction perpendicular to sheet 76 as it advances across the surface of anvil 84. To resiliently urge stop pins 188 into engagement with a pair of perforations 184 in sheet 76 as they become aligned with said pins during movement of said sheet across the surface of anvil 84, a pair of coiled tension springs 208 are provided. Each spring 208 is secured at one end to one of a pair of ears 210 turned up from support portion 196 of member 180 and at its other end to one of a pair of ears 212 turned out from arms 202 of support member 198.

To withdraw stop pins 188 from engagement with a pair of perforations 184 in sheet 76 in order to permit the continued advancement of the sheets, support member 198 includes an elongated actuating portion 214 and there is provided a pin 216 extending through a slot in the side of rear portion 54 into engagement with portion 214. A knob or button 217 is secured to the end of pin 216 to provide means for the operator to move pin 216 in engagement with portion 214 rearward and thereby pivot base portion 200 of member 198 rearward to withdraw pins 188 from engagement with sheet 76. Normally, the stop pins abut against and ride on the surface of sheet 76 as the sheets are advanced through the camera between the surface of anvil 88 and the surface of support portion 196. As a pair of perforations 184 become aligned with a pair of stop pins 188, at least one of the pins projects into and engages one of the perforations, arresting advancement of the sheets. To permit continued advancement of the sheets, the operator actuates button 217 to pivot member 198 rearwardly and withdraw the pins from the perforations.

Means are provided for holding pins 188 out of engagement with sheet 76, following withdrawal of said pins, until sheet 76 has been advanced a predetermined minimum length so that the pins will not re-enter the same perforations from which they had been previously withdrawn. As heretofore mentioned, the operator may mistake the sudden resistance to advancement of the sheets, due to the passage of the collecting means between the pressure-applying rollers, to be due to engagement of the stop pins with a pair of perforations and therefore cease to advance the sheets. When this occurs, pins 188 may be abutting against sheet 76 adjacent perforations 184 and then when the operator attempts to release the pins from perforations 184 with which he had mistakenly thought them engaged, the pins are withdrawn from contact with sheet 76. The predetermined length that sheet 76 must be advanced before pins 188 are again permitted to bear against sheet 76 under the bias of springs 208 is sufficient to insure that the last-mentioned pair of perforations have been advanced past pins 188 and will not suddenly engage the pins and thereby cause sheet 76 to be torn.

In a preferred embodiment of the invention, means for retaining pins 188 out of engagement with sheet 76 comprise a pair of latch members 218 pivotally mounted at opposite sides of the housing on a shaft 220. Shaft 220 is mounted adjacent its ends in a pair of tabs 221 turned down from support portion 196 of member 180. Each latch member 218 includes a hook-shaped latch portion 222 adapted to engage and retain base portion 200 of member 198 when the latter is pivoted rearward. A torsion spring 224 coiled around shaft 220 is provided for urging latch portions 222 of latch members 218 in a counterclockwise direction (viewing Fig. 2) into engagement with portion 200.

To release latch members 218 from engagement with base portion 200 after a predetermined length of the sheets has advanced between pressure rollers 96 and 98, pressure roller 98 is provided with a pair of wipers or elongated cams 226 coaxially mounted at opposite ends of roller 98 and each having an actuating portion spaced 180° from the actuating portion of the other. Latch members 218 include cam-following portions 228 adapted to ride on cams 226. Cams 226 and latch members 228 are so constructed and mounted that said cams are capable of pivoting latch members 218 in a clockwise direction against the bias of spring 224 (viewing Fig. 2) to unlatch said latch members from engagement with base portion 200 and allow pins 188 to project through apertures 197 in support portion 196 into engagement with sheet 76. The actuating portions of cams 226 are positioned 180° apart so that regardless of the position of roller 98 when stop pins 188 are withdrawn from engagement with sheet 76, at least one of latch members 218 is in position to engage and retain base portion 200 (although the other latch members may be held out of engagement by a cam). Since rotation of the cams is caused by rotation of roller 98 and the advancement of the sheets between the rollers, the positioning of the cams with their actuating portions 180° apart provides for rotation of roller 98 at least 180° before support member 200 is released, and the diameter of roller 98 is such that the length of sheet 76, which must be advanced between the rollers to rotate roller 98 through 180°, is sufficient to insure movement of a pair of perforations 184, with which stop pins 188 were either engaged or thought to be engaged, past the stop pins.

Figures 8, 10, 11:
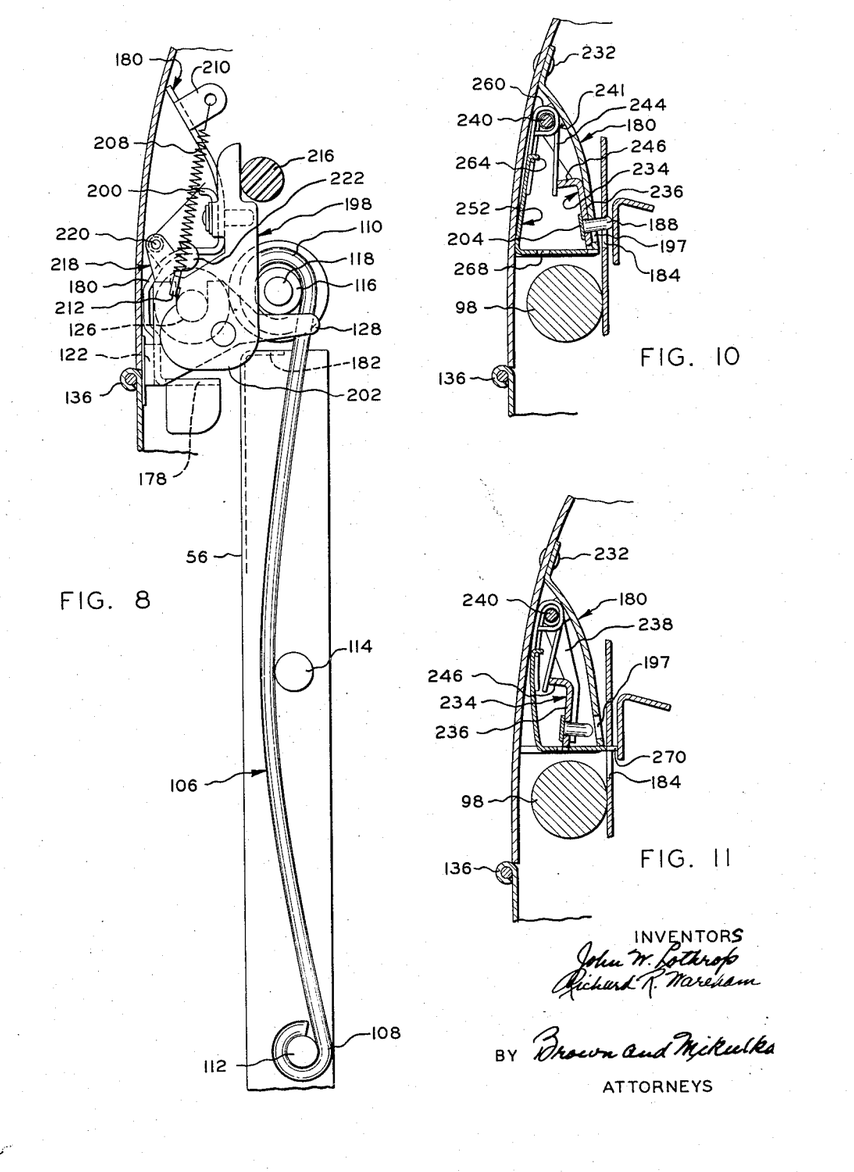
Fig. 8 is a view, partially in section and with parts broken away, showing elements of the camera of Fig. 1.
Fig. 10 is a fragmentary, sectional view illustrating the embodiment of Fig. 9 in position for arresting the advancement of sheet material.
Fig. 11 is a view similar to that of Fig. 10 with the device illustrated in released position.
Figure 9:
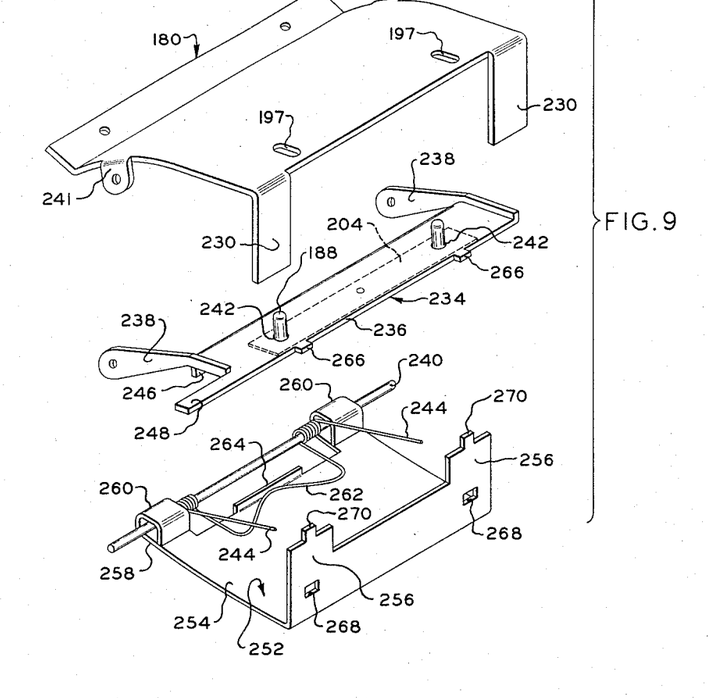
Fig. 9 is an exploded perspective view of another embodiment of the herein disclosed invention.

Referring now to Figs. 9 through 11, there is shown another stop means embodying the present invention, like numerals indicating like parts of the previous figures. The stop means include sheet metal member 180 having a curved support portion 196 across which sheet 76 is adapted to advance between said portion and anvil 84, and two turned-down legs 230 adapted to abut against rear portion 54 and support one side of member 180, the latter being secured to rear portion 54 at its other side by such means as rivets 232. A yoke-shaped supporting member 234 is provided for mounting stop pins 188 and includes a transverse portion 236 and two legs 238 at which it is pivotally mounted on an elongated pin 240 between member 180 and rear portion 54. A pair of tabs 241 are turned down from support portion 196 of member 180 to provide means for mounting pin 240 adjacent its ends. Support portion 196 includes a pair of apertures 197 aligned with grooves 186 and transverse portion 236 of member 234 is provided with a pair of apertures 242 in alignment with apertures 197. Stop pins 188 are secured to the ends of a leaf spring 204 affixed at its midportion to transverse portion 236 with pins 188 projecting through apertures 197 and 242. To urge pins 188 forward through apertures 197 and 242 into engagement with sheet 76, there is provided a torsion spring 244 coiled around pin 240 and engaging a flange 246 on transverse portion 236 to urge the latter forward toward support portion 196. As a means for pivoting supporting member 234 rearward against the bias of spring 244, member 234 includes an elongated finger 248 extending from transverse portion 236 exteriorly of housing 20 through a slot in a side of rear portion 54 and a manually engageable button may be secured to the end of finger 248, providing means for the operator to grasp and for rendering the slot lighttight.

As a means for retaining member 234 at its rearward position with pins 188 out of engagement with sheet 76, there is provided a latch plate 252 having a base portion 254 and two legs 256 turned up from base portion 254 and extending forward toward sheet 76. Latch plate 252 is pivotally mounted on pin 240 with base portion 254 normally disposed adjacent rear portion 54 and with legs 256 extending forward toward anvil 84 and sheet 76. To pivotally mount plate 252, said plate includes a second pair of legs 258 extending from base portion 254 substantially in the same plane. The end portions of legs 258 are bent to form elongated loops 260 on which plate 252 is pivotally mounted on pin 240. By virtue of the mounting of plate 252 on elongated loops 260, said plate is also free for limited movement in a direction generally parallel to the direction of movement of sheet 76 between anvil 84 and member 196. A spring 262 coiled around pin 240 is provided to urge plate 252 toward rear portion 54 and in a direction opposite the direction of movement of sheet 76. The torsional bias of spring 262 is less than the bias of spring 244 and spring 262 includes at least a portion in engagement with a flange 264 turned up from base portion 254.

Transverse portion 236 of member 234 is provided with a pair of projections 266 and adapted to be engaged in a pair of apertures 268 in legs 256 of plate 252. Apertures 268 are so positioned that when member 234 is pivoted rearward to withdraw pins 188 from sheet 76, projections 266 are engaged by apertures 268 and thereby retain member 234 in its rearward position with pins 188 out of engagement with sheet 76. Spring 244, being stronger than spring 262, overcomes the bias of spring 262 and urges plate 252 toward sheet 76 so that the ends of legs 256 bear against sheet 76, holding pins 188 from engagement with the sheet.

Means are provided for releasing member 234 to allow pins 188 to return to engagement with sheet 76 after a pair of perforations 184 with which the pins were engaged, or thought to be engaged, have been advanced past the pins. In the form shown, this means comprises a pair of stub fingers 270 extending from the ends of legs 256 and adapted to project into and engage perforations 184 in sheet 76 as said perforations become aligned with fingers 270. When fingers 270 engage a pair of perforations during advancement of sheet 76, plate 252 is moved in the direction of advancement of the sheet so as to disengage projections 266 from apertures 268 and permit member 234 to pivot forward under the bias of spring 244, moving pins 188 into engagement with sheet 76. Upon disengagement of projections 266 with apertures 268, plate 252 pivots rearward under the bias of spring 262 so that fingers 270 are withdrawn from engagement with perforations 184 in sheet 76 and the sheets are permitted to continue their advancement until pins 188 engage the next successive pairs of perforations and arrest advancement of the sheet.

In the operation of the illustrated camera, rear portion 54 and intermediate portion 56 are pivoted to open position to provide access to the interior of housing 20. Spool 48 is mounted on member 64 and roll 78 is inserted between legs 88 of member 82. Sheet 46 is drawn from spool 48 onto guide surfaces 30 which position frames of sheet 46 in the focal surface of the lens of assembly 22. Sheets 46 and 76 now are superposed and are extended from roller 96 along the rear surface of intermediate portion 56 to a point beyond the pivoted end thereof. Rear portion 54 now is pivoted to a closed position in order to operatively juxtapose rollers 96 and 98 and to form processing chamber 62. The leading ends of sheets 46 and 76 now are grasped and are drawn from processing chamber 62 until stop pins 188 engage the perforations 184 in sheet 76 which are associated with the leading frame of sheet 46. The leading frame of sheet 46 is now in position for exposure and, after exposure of this frame, button 216 is actuated to disengage stop pins 188 from perforations 184 with which they were engaged. An operator once again may grasp the leading ends of sheets 46 and 76 and may advance the sheets between rollers 96 and 98 until stop pins 188 once again engage the perforations 184 in sheet 76. During advancement of sheets 46 and 76 between rollers 96 and 98 and into processing chamber 62, processing composition is ejected from the trailing edge of container 80 and is spread between a frame of sheet 46 and an image-receiving area of sheet 76, the processing composition acting to process the frame and to form a positive print in the image-receiving area. When the superposed frame and image-receiving area have remained in processing chamber 62 for a predetermined processing period, door 134 is opened and the section of sheet 76 which carries the positive print is ripped from the remainder of sheet 76 and at the same time is peeled from the frame of sheet 46. As the exposure and processing cycle continues, portions of sheets 46 and 76 that extend through exit passage 132 may be evenly severed from the remainder of sheets 46 and 76 by tearing them against edge 158 of bar 148.

It is to be expressly understood that the herein disclosed invention may be applied to photographic structures other than the camera herein illustrated and the invention, for example, may be applied to various processing units which are not directly associated with a photographic exposure means.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus of the type wherein sheet material is advanced, in combination, means for arresting advancement of a sheet through said apparatus, said means including a pair of stop pins adapted to project into and engage a pair of successive pairs of perforations in said sheet for arresting the movement of said sheet past said stop pins, and means for mounting said stop pins for movement both together and independently of one another in a direction substantially perpendicular to the direction of advancement of said sheet, resilient means normally urging said stop pins toward said sheet and into contact therewith, manually operable means for withdrawing said stop pins from contact with said sheet and from engagement with said pair of perforations, latch means for releasably retaining said stop pins out of contact with said sheet, and means positioned in engagement with said sheet and responsive to the advancement of said sheet for automatically releasing said latch means when one of said pairs of perforations has been moved past said pins to permit said pins to move into contact with said sheet.

2. In photographic apparatus of the type wherein a sheet of photosensitive material is exposed and thereafter processed by a layer of processing composition, in combination, a pair of pressure-applying rollers between which said sheet is adapted to be advanced for spreading said processing composition, means for arresting advancement of said sheet through said apparatus, said means including at least one stop member capable of engaging successive engageable portions of said sheet as it is advanced past said member, pivotal means mounting said stop member for movement in a direction substantially perpendicular to the direction of movement of said sheet and resilient means normally urging said pivotal means and said stop member into operative position toward said sheet and said stop member into engagement with said sheet, manually operable control means for pivoting said pivotal means and said stop member into an inoperative position away from said sheet with said stop member out of contact with said sheet, latch means for releasably retaining said pivotal means in inoperative position, and means responsive to the advancement of said sheet between said rollers for automatically releasing said pivotal means from said latch means after one of said engageable portions has been advanced a predetermined distance past said stop member.

3. In photographic apparatus through which sheet material is advanced, in combination, means for arresting advancement of a sheet through said apparatus, said means including at least one stop member capable of engaging successive engageable portions of said sheet as the latter is moved past said member, pivotal means for mounting said stop member for movement in a direction substantially perpendicular to the direction of movement of said sheet and resilient means normally urging said pivotal means toward said sheet and said stop member and into contact therewith, manually operable control means for pivoting said pivotal means away from said sheet and said stop member out of contact with said sheet, at least one movably mounted latch member including a latch portion capable of releasably retaining said pivotal means away from said sheet and said stop member out of contact with said sheet and an actuating portion, and means mounted in engagement with said sheet and responsive to the advancement thereof for coacting with said actuating portion to move said latch member so as to release said pivotal means when one of said engagement portions has been moved a predetermined distance past said stop member.

4. In photographic apparatus of the type through which sheet material is advanced, means for arresting advancement of a sheet through said apparatus, said means including a pair of stop pins adapted to project into and engage one of successive pairs of perforations in said sheet as the latter is moved past said pins in contact therewith, pivotal means mounted adjacent the path of said sheet and having a transverse member movable in a direction substantially perpendicular to the direction of movement of said sheet, spring means secured to said transverse member and mounting said stop pins for movement independently of one another and resilient means normally urging said transverse member and said stop pins toward said sheet and into operative position with said stop pins in contact with said sheet, manually operable means for moving said transverse member and said stop pins away from said sheet into inoperative position with said stop pins out of contact with said sheet, latch means capable of releasably engaging said transverse member and retaining the latter in inoperative position, and means positioned in engagement with said sheet and responsive to movement of said sheet to cause said latch means to release said transverse member when at least a predetermined minimum length of said sheet has moved past said pins.

5. In photographic apparatus of the type wherein a sheet of photosensitive material is exposed and thereafter processed by a layer of processing composition spread thereon, in combination, a pair of pressure-applying rollers between which said sheet is adapted to be advanced for spreading said processing composition, means for arresting advancement of said sheet through said apparatus, said means including at least one stop member capable of engaging successive engageable portions of said sheet, pivotal means for mounting said stop member for movement in a direction substantially perpendicular to the direction of movement of said sheet and resilient means normally urging said pivotal means toward said sheet and said stop member and into engagement therewith, manually operable control means for pivoting said pivotal means away from said sheet and said stop member out of engagement therewith, a pair of movably mounted latch members each including a latch portion capable of releasably retaining said pivotal means away from said sheet and an actuating portion, and means comprising portions of one of said rollers adapted to cooperate with said actuating portions for moving said latch members so as to release said pivotal means when said one roller is rotated through a predetermined minimum angle by advancement of said sheet between said rollers.

6. In photographic apparatus of the type wherein a sheet of photosensitive material is exposed and thereafter processed by a layer of processing composition spread thereon, in combination, a pair of pressure-applying rollers between which said sheet is adapted to be advanced for spreading said processing composition, means for arresting advancement of said sheet through said apparatus, said means including at least one stop member capable of engaging successive engageable portions of said sheet, pivotal means for mounting said stop member for movement in a direction substantially perpendicular to the direction of movement of said sheet and resilient means normally urging said pivotal means toward said sheet and said stop member into engagement therewith, manually operable control means for pivoting said pivotal means away from said sheet and said stop member out of engagement with said sheet, a pair of latch members each having a latch portion and an actuating portion, means for pivotally mounting said latch members and normally biasing said latch portions of said members into engagement with said pivotal means so as to releasably retain said pivotal means away from said sheet, and means secured to the ends of one of said rollers in engagement with said actuating portions, the last-mentioned means coacting with said actuating portions when said roller is rotated through a predetermined minimum angle by advancement of said sheet between said rollers to pivot said latch members so as to disengage said latch portions from said pivotal means and release the latter.

7. In photographic apparatus of the type wherein a sheet of photosensitive material is exposed and thereafter processed by a layer of processing composition spread thereon, in combination, a pair of pressure-applying rollers between which said sheet is adapted to be advanced for spreading said processing composition, means for arresting advancement of said sheet through said apparatus, said means including at least one stop member capable of engaging successive engageable portions of said sheet, pivotal means for mounting said stop member for movement in a direction substantially perpendicular to the direction of movement of said sheet and resilient means normally urging said pivotal means toward said sheet and said stop member and into engagement therewith, manually operable control means for pivoting said pivotal means away from said sheet and said stop member out of engagement with said sheet, a pair of members each having a latch portion capable of engaging and releasably retaining said pivotal means and a cam-following portion, means pivotally mounting said latch members, spring means normally biasing said latch members into engagement with said pivotal means so as to releasably retain said pivotal means in position spaced away from said sheet, and a pair of cams secured to opposite ends of one of said pressure rollers in engagement with said cam-following portions, said cams being capable of coacting with said cam-following portions to pivot said latch members and disengage said latch portions from said pivotal means, said cams being so positioned on said one roller as to pivot said latch members when said one roller is rotated through a predetermined minimum angle by advancement of said sheet between said rollers.

8. In photographic apparatus of the type wherein a sheet of photosensitive material is exposed and thereafter processed by a layer of processing composition spread thereon, in combination, a pair of pressure-applying rollers between which said sheet is adapted to be advanced for spreading said processing composition, means for arresting advancement of said sheet through said apparatus, said means including a pair of stop members adapted to engage one of successive pairs of engageable portions in said sheet, pivotal means mounted adjacent the path of said sheet and having a transverse member movable in a direction substantially perpendicular to the direction of movement of said sheet, spring means secured to said transverse member and mounting said stop members for movement independently of one another and resilient means normally urging said transverse member and said stop members toward said sheet and into operative position wherein said stop members are in engagement with said sheet, manually operable means for moving said transverse member and said stop members away from said sheet and into inoperative position wherein said stop members are out of engagement with said sheet, a pair of members each having a latch portion capable of engaging and releasably retaining said pivotal means and a cam-following portion, means pivotally mounting said latch members, spring means normally biasing said latch members into engagement with said pivotal means so as to releasably retain said pivotal means in inoperative position, and a pair of cams coaxially mounted on opposite ends of one of said rollers, each of said cams having an actuating portion adapted to coact with one of said cam-following portions when said one roller is rotated to pivot said latch member and disengage said latch portions from said transverse member, said actuating portions of said cams being displaced 180° from one another, said one roller being of a diameter requiring advancement of a predetermined minimum length of said sheet between said rollers in order to rotate said cams through 180°.

9. In photographic apparatus through which sheet material is advanced, in combination, means for arresting advancement of a sheet through said apparatus, said means including at least one stop member capable of engaging successive engageable portions of said sheet, pivotal means for mounting said stop member for movement in a direction substantially perpendicular to the direction of movement of said sheet and a first resilient means normally urging said pivotal means and said stop member into operative position wherein said stop member is in engagement with said sheet, manually operable control means for pivoting said pivotal means and stop means into inoperative position wherein said stop member is out of engagement with said sheet, a latch plate including at least one actuating member adapted to abut against and ride on a surface of said sheet during movement of said sheet, means for pivotally mounting said latch plate for movement in a plurality of directions one of which is substantially perpendicular to the direction of advancement of said sheet and another of which is substantially parallel to the direction of advancement of said sheet, second resilient means normally urging said actuating member away from said sheet and in a direction opposite the direction of advancement of said sheet, said first resilient means being capable of exerting greater force than said second resilient means, said latch plate including means capable of engaging portions of said pivotal means when the latter is moved into inoperative position whereby said pivotal means is retained in inoperative position and said actuating member is held in contact with said sheet, said actuating member including an element adapted to be engaged by said engageable portion of said sheet during advancement of said sheet whereby said actuating member is displaced in the direction of movement of said sheet to release said pivotal means for movement into operative position.

10. In photographic apparatus through which sheet material is advanced, in combination, means for arresting advancement of a sheet through said apparatus, said means including a pair of stop pins adapted to project into and engage one of successive pairs of perforations in said sheet, pivotal means mounted adjacent the path of said sheet and having a transverse member movable in a direction substantially perpendicular to the direction of movement of said sheet, spring means secured to said transverse member and mounting said stop pins for movement independently of one another and first spring means normally urging said transverse member and said stop pins toward said sheet and into operative position wherein said stop pins are in engagement with said sheet, manually operable means for moving said transverse member and said stop pins away from said sheet into inoperative position wherein said stop pins are withdrawn from engagement with said sheet, a latch plate including two actuating members extending toward and adapted to abut against and ride on the surface of said sheet during movement thereof, means for pivotally mounting said latch plate for movement in a plurality of directions one of which is substantially parallel to the direction of movement of said transverse member and the other of which is substantially parallel to the direction of advancement of said sheet, second spring means normally urging said actuating member away from said sheet and in a direction opposite the direction of advancement of said sheet, said first spring means being capable of exerting a greater force than said second spring means, said latch plate including portions capable of engaging portions of said transverse member when the latter is moved into inoperative position whereby said transverse member is retained in inoperative position and said actuating member is held in contact with the surface of said sheet, each of said actuating members including a portion adapted to project into and be engaged by an engageable portion of said sheet during advancement of said sheet so as to displace said actuating member in the direction of movement of said sheet and release said transverse member for movement under the bias of said first spring means into operative position.

11. In photographic apparatus through which sheet material is advanced, in combination, means for arresting advancement of a sheet through said apparatus, said means including a pair of stop pins adapted to project into and engage one of successive pairs of perforations in said sheet, support means having a transverse member to which said stop pins are secured, a latch plate having a pair of actuating members and means for pivotally mounting said support means and said latch plate adjacent the path of movement of said sheet for movement about the same axis, said latch plate including a pair of actuating members extending toward said sheet and into contact therewith, said latch plate being mounted for movement in a plurality of directions one of which is substantially perpendicular to the direction of movement of said sheet and another of which is substantially parallel to the direction of movement of said sheet, first spring means normally urging said latch plate and said actuating members away from said sheet, said transverse member being mounted between said latch plate and the path of movement of said sheet for movement in a direction substan- tially perpendicular to the direction of movement of said sheet, second spring means normally urging said transverse member and said stop pins toward said sheet and into operative position wherein said stop pins are in engagement with said sheet, said second spring means being capable of exerting greater force than said first spring means, manually operable means for moving said transverse member and said stop pins away from said sheet into inoperative position wherein said stop pins are out of engagement with said sheet, said latch plate including portions capable of engaging portions of said transverse member when the latter is moved into operative position whereby said transverse member is retained in inoperative position and said actuating members are urged into contact with said one sheet by said second spring means, each of said actuating members including a portion adapted to project into and be engaged by one of a pair of apertures in said sheet during advancement of said sheet to displace said actuating members in the direction of advancement of said sheet and release said transverse member for movement under the bias of said first spring means into operative position.

12. In photographic apparatus through which sheet material is advanced, the combination, in said apparatus, of means for arresting the advancement of a sheet and including at least one detent member capable of engaging successive engageable portions of said sheet as said sheet is advanced past said member, means mounting said detent member for movement toward and away from said sheet between a first position wherein said detent member is in contact with said sheet and is operative to engage engageable portions of said sheet for arresting the movement thereof, and a second position wherein said detent member is inoperative to engage said sheet, resilient means normally urging said detent member into said first position, manually operable means for withdrawing said detent member from contact with said sheet and moving said detent member into said second position, and means for engaging and retaining said detent member in said second position, the last-mentioned means including a section located in contact with said sheet and movable by engagement with an engageable portion of said sheet for releasing said detent member to return to said first position after said engageable portion has been advanced a predetermined distance past said detent member.

13. In photographic apparatus of the type wherein a sheet of photosensitive material is exposed and thereafter processed by a layer of liquid processing composition, in combination, means for spreading said processing composition on said sheet as it is advanced through said apparatus, means for arresting advancement of said sheet and including at least one detent member capable of engaging successive engageable portions of said sheet as said sheet is advanced past said detent member, means mounting said detent member for movement toward and away from said sheet between a first position wherein said detent member is in contact with said sheet and is operative to engage engageable portions of said sheet for arresting the movement thereof, and a second position wherein said detent member is inoperative to engage said sheet, resilient means normally urging said detent member into said first position, manually operable means for withdrawing said detent member from contact with said sheet and moving it into said second position, and means for engaging and retaining said detent member in said second position, the last-mentioned means including a section located in contact with said sheet on the side of said detent member opposite said spreading means and movable by engagement with an engageable portion of said sheet for releasing said detent member to return to said first position after said engageable portion has been advanced a predetermined distance past said detent member.

14. In photographic apparatus of the type wherein a sheet of photosensitive material is exposed and thereafter processed by a processing composition distributed on said sheet, in combination, a pair of members between which said sheet is advanced for distributing said processing composition thereon, means for arresting advancement of said sheet and including at least one detent member capable of engaging successive engageable portions of said sheet as said sheet is advanced past said detent member, means mounting said detent member for movement toward and away from said sheet between a first position wherein said detent member is in contact with said sheet and is operative to engage engageable portions of said sheet for arresting the movement thereof, and a second position wherein said detent member is inoperative to engage said sheet, resilient means normally urging said detent member into said first position, manually operable means for withdrawing said detent member from contact with said sheet and moving it into said second position, and means for engaging and retaining said detent member in said second position, the last-mentioned means including a section located in contact with said sheet at a position on the side of said detent member remote from the first-mentioned pair of members and movable by engagement with an engageable portion of said sheet for releasing said detent member to return to said first position after said engageable portion has been advanced a predetermined distance past said detent member.

15. In photographic apparatus through which sheet material is advanced, in combination, means including a pair of detent members adapted to engage one of successive pairs of perforations in a sheet to arrest advancement of said sheet past said members, means mounting said detent members for movement, both together and independently of one another, toward and away from said sheet between a first position wherein said members are in contact with said sheet and are operative to engage a pair of perforations in said sheet for arresting the movement thereof, and a second position wherein said members are inoperative to engage said sheet, resilient means normally urging said members into said first position, manually operable means for withdrawing said detent members from contact with said sheet and moving said members into said second position, and means for engaging and retaining said detent members in said second position, the last-mentioned means including a section located in contact with said sheet and movable by engagement with at least one of said perforations in said sheet for releasing said detent members to return to said first position after said pair of perforations has been advanced a predetermined distance past said detent members.

References Cited in the file of this patent

UNITED STATES PATENTS 1,535,930   McDonald _____________ Apr. 28, 1925

FOREIGN PATENTS 623,255   Germany _____________ Dec. 16, 1935